June 1, 1971  J. F. THOMAS  3,582,439

ID CARD LAMINAR STRUCTURES AND PROCESSES OF MAKING SAME

Filed April 1, 1968  2 Sheets-Sheet 1

INVENTOR.
James F. Thomas
BY Brown and Mikulka
and
Alvin Isaacs
ATTORNEYS

June 1, 1971    J. F. THOMAS    3,582,439
ID CARD LAMINAR STRUCTURES AND PROCESSES OF MAKING SAME
Filed April 1, 1968    2 Sheets-Sheet 2

INVENTOR.
James F. Thomas
BY
Brown and Mikulka
and
Alvin Isaacs
ATTORNEYS

United States Patent Office 3,582,439
Patented June 1, 1971

3,582,439
ID CARD LAMINAR STRUCTURE AND PROCESSES OF MAKING SAME
James F. Thomas, Lawrence, Mass., assignor to Polaroid Corporation, Cambridge, Mass.
Filed Apr. 1, 1968, Ser. No. 717,732
Int. Cl. B32b 27/04; G03c 5/59; G09f 3/02
U.S. Cl. 161—5
20 Claims

ABSTRACT OF THE DISCLOSURE

Laminar structures comprising a color photograph bonded to a sheet of vinyl through an ethylene-vinyl acetate copolymer tie coat and identification (ID) cards including the same.

BACKGROUND OF THE INVENTION

ID cards including a color photograph having a transparent protective overlay applied to the image-bearing surface of the photograph are per se old. It is, for example, old to laminate a color photograph, e.g., one prepared according to the invention described and claimed in U.S. Pat. 2,983,606, issued to Howard G. Rogers, to a cellulose ester, through a water-activated adhesive such as polyvinyl alcohol. Such a structure protects the front of the card but affords no protection to the rear. Hence, the resulting laminar structure is not as desirable, for many purposes, as a fully enclosed card, i.e., a card containing a protective overlay fully enclosing the card.

One useful procedure for fully protecting the card is to enclose it in a pouch. This would typically be done by providing a pouch comprising front and back members sealed along a portion of the periphery, e.g., on three sides, and having an open portion adapted to receive the photograph or other document, the open portion being sealed, preferably by heat sealing following insertion.

However, cellulose esters are not readily sealable together and hence are not ideal materials for forming such a pouch.

To obviate this problem, it has further been suggested to provide a pouch of a heat-sealable material, preferably a rigid or semi-rigid vinyl, e.g., the polyvinyl chloride or polyvinyl chloride-polyvinyl acetate copolymers heretofore known in the art.

One particularly useful procedure has been to laminate the color print to polyvinyl alcohol contained on a transparent cellulose ester support to protect the print during handling and thereafter insert the resulting laminar structure into a vinyl pouch and then sealing the open side to provide the desired protected ID card. However, this procedure has certain inherent disadvantages, the main one being that the print provided with its cellulose ester overlay is not affixed to the pouch walls so that it is movable therewithin. This in turn would permit one to sever the pouch and tamper with the identifying matter therewithin to provide a false or forged ID card. Stated more simply, such a pouch does not provide a satisfactory security seal. Moreover, in certain specialized applications such as the so-called Hollerith holepunched card, it is required that the photograph or other identifying matter be substantially immovable within the pouch.

SUMMARY OF THE INVENTION

The present invention obviates all of the aforementioned difficulties by providing a system for securely laminating the image-bearing surface of a color print to a sheet of vinyl. The resulting ID card may be in the form of a sheet of vinyl laminated to the surface of the color print or it may be in the form of a vinyl pouch having a color print contained therein with at least the image-bearing surface securely laminated to the inner surface of one wall of the pouch. If desired, the rear surface or support member for the print may be laminated to the inner surface of the other wall of the pouch. Preferably the pouch is constructed to be of slightly greater dimensions than the color print so that the periphery of the superposed wall member can be bonded together, as by heat-sealing, to completely enclose the print.

The aforementioned objectives are accomplished by applying to the surface of the vinyl sheet or layer a bonding surface comprising a first layer of an ethylene-vinyl acetate copolymer and a second layer of a transparent hydroxylated polymer, e.g., a polyvinyl alcohol, hydrolyzed polyvinyl acetate, or hydrolyzed cellulose ester. The resulting bonding surface is water-activated so that lamination can be effected by pressing the moist print against the bonding surface.

DESCRIPTION OF PREFERRED EMBODIMENT

Figure 1:
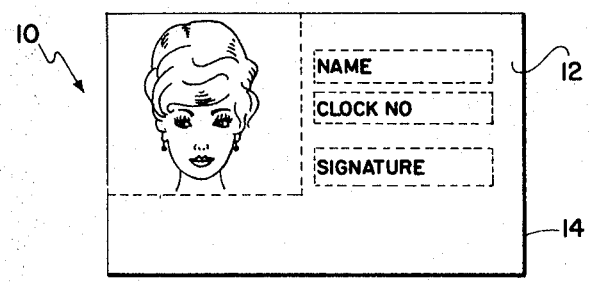
FIG. 1 is a plan view of one format of color print contemplated for use in the practice of this invention.

The preferred embodiment contemplates laminar structures including a color print prepared in the manner described and claimed in U.S. Pat. No. 2,983,606, which print is completely enclosed by two sheets of vinyl sealed together along their periphery and having the surface of the print securely laminated to the inner surface of one of the vinyl sheets.

As was mentioned previously, this invention relates to novel laminar structures and more particularly to novel ID cards, credit cards and the like having an image-bearing surface bonded to a sheet or layer of vinyl through an ethylene-vinyl acetate copolymer "tie coat."

A primary object of this invention is to provide novel products of the foregoing description.

Another object is to provide ID cards and the like having a tamperfree security seal.

Still another object is to provide novel products and processes for preparing the same.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawing.

As was mentioned previously, this invention is directed to ID cards, credit cards and the like including a color photograph or print the surface of which is laminated or bonded securely to a layer of vinyl.

A particularly useful photographic procedure for forming the color print is described and claimed in the aforementioned U.S. Pat. No. 2,983,606. In such a procedure, a photosensitive element including at least one light-sensitive silver halide emulsion and associated layer of dye developer (dye which is also a silver halide developing agent) is exposed to provide a developable image; the thus exposed element is contacted with an aqueous alkaline processing composition to develop the image and as a function thereof to form an imagewise distribution of mobile and diffusible dye; and this imagewise distribution is then transferred, at least in part, by imbibition, to a superposed image-receiving element comprising a dyeable stratum to impart thereto a positive dye transfer image of the original subject matter.

The image-receiving element used in these processes generally comprises an opaque or transparent support coated with an image-receiving layer of a dyeable material which is permeable to the alkaline processing composition. The dyeable material may comprise polyvinyl alcohol together with a polyvinyl pyridine polymer such as a poly-4-vinyl pyridine polymer. Such image-receiving elements are further described in U.S. Pat. No. 3,148,061 issued to Howard C. Haas.

The foregoing discussion relates generally to the preparation of color transfer prints. In a typical ID card, it is usually desired to have a photographic likeness of the bearer of the card along with descriptive identifying matter pertaining to him, e.g., his name, an identifying number, signature, etc. Frequently, the name of the issuer of the card and a validating signature authenticating the card are also desired. A typical photograph of this nature is shown in FIG. 1 wherein it will be seen that the print 10 comprises an image-containing layer 12 on a suitable support 14 of paper or the like. In layer 12 a photographic likeness of the individual appears at one portion of the print and the desired descriptive matter is contained at another portion. The descriptive indicia may be supplied by any desired means, e.g., typing, but is preferably a part of the photograph.

A preferred system for preparing print 10 utilizes the aforementioned color diffusion transfer procedures. A data card containing the desired descriptive information is inserted into the camera so that both the subject and the descriptive matter pertaining to him are simultaneously photographed to provide a single developable image which is thereafter processed in the aforementioned manner to provide print 10. This may be accomplished most expeditiously with the camera of the Polaroid ID-2 Land Identification System.

Figure 2:
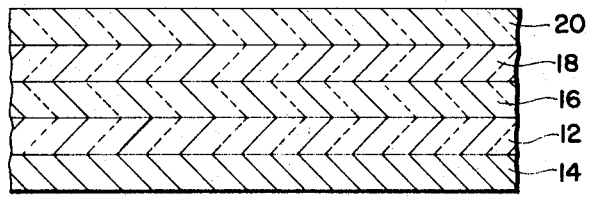
FIG. 2 is a diagrammatical sectional view, greatly magnified, of one product contemplated by this invention.

In the simplest embodiment of the invention a laminar structure is prepared as shown in FIG. 2. As shown therein, the laminar structure comprises a color print, e.g., as shown in FIG. 1, comprising a suitable support 14 for a stratum 12 containing the color image. Stratum 12 is bonded to a layer 16 of a transparent hydroxylated polymer, e.g., polyvinyl alcohol, which is bonded to a layer of an ethylene-vinyl acetate copolymer 18 which is in turn bonded to a vinyl sheet 20 providing the protective overlay, e.g., a sheet of rigid or semirigid plasticized polyvinyl chloride. Sheet 20 together with support 14 preferably provides the requisite strength and rigidity to maintain the planar shape of the card and to prevent damage due to bending, folding, etc. Where support 14 is of sufficient rigidity for this purpose, sheet 20 can of course be quite thin. Sheet 20 may, if desired, in turn be bonded to another surface, e.g., a second sheet of vinyl of the same or different thickness.

As examples of suitable ethylene-vinyl acetate copolymers contemplated for use in the present invention, mention may be made of "Aircoflex 400" (trademark of Airco Chemical Company for an acetoxylated polyethylene emulsion using partially acetylated polyvinyl alcohol as a protective colloid); "Elvace" (trademark of E. I. du Pont de Nemours, for a similar product), etc. The copolymer may be applied to the vinyl sheet as an aqueous dispersion. If desired, a suitable aromatic solvent, e.g., toluene, xylene, benzene, etc., may be included in the coating solution. It is postulated that the inclusion of such a solvent may increase adhesion still further. However, since the bond is so strong without the use of an aromatic solvent, no evidence of increased adhesion with the solvent has been observed.

A card such as shown in FIG. 2 protects the front or image-bearing surface of the print and to this extent is satisfactory for many purposes. However, the preferred form of the invention contemplates completely encasing the card for greater protection and for other reasons which will be discussed hereinafter.

Figure 3:
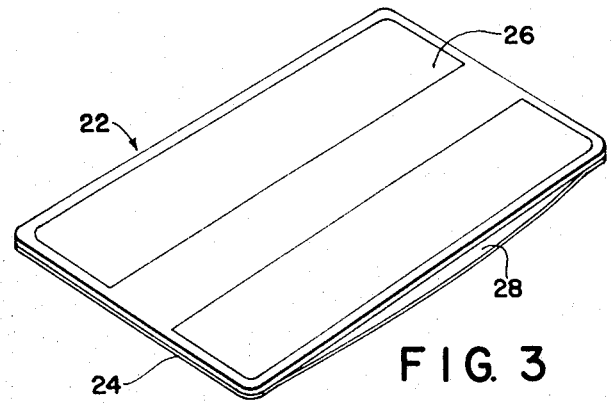
FIG. 3 is a plan view of a pouch contemplated for use in the practice of this invention.

One means for encasing the card comprises a pouch or the like such as is shown in FIG. 3. As shown therein, pouch 22 comprises two superposed sheets defining a front wall member 24 and a rear wall member 26 sealed along a portion of the periphery leaving an open area for insertion of the print. In the form shown in FIG. 3, the two members are shown to be sealed along three sides, leaving one longitudinal side 28 open for insertion. Front member 24 comprises a sheet of vinyl, which, like the embodiment of FIG. 2, is effectively transparent for viewing the print inserted between the respective wall members. The inner surface of the front wall member is provided with the coatings of an ethylene-vinyl acetate copolymer and a transparent hydroxylated polymer, similar to layers 18 and 16, respectively of FIG. 2. Rear wall member 26 may be made of the same or of a different material. It need not be made of vinyl and may, for example, be made of any rigid or semi-rigid plastic, e.g., cellulose acetate butyrate, a polymerized polyethylene glycol ester, etc. Unlike front wall member 24, it need not be effectively transparent and in a preferred form it is in fact opaque, e.g., includes a white pigment or some other colorant. The sealing of the periphery of the respective wall members may be accomplished in any known manner, e.g., by heat sealing, with pressure- or heat-activated adhesives, etc. Preferably, rear wall member 26 comprises a sheet material heat-sealable to front wall member 24 and hence is preferably also made of vinyl.

In the embodiments so far described, the bonding of the surface of the color print to the layer of hydroxylated polymer may be accomplished simply by pressing the print, while moist, against the polymeric layer. The print may be so employed while still moist from processing, i.e., shortly after image formation while the print is still slightly moist, or at a later time after the print has dried by remoistening it.

Figure 4:
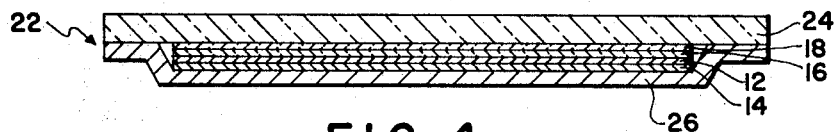
FIG. 4 is a diagrammatical sectional view of a product contemplated by this invention formed by insertion of an imformation-bearing surface into the pouch of FIG. 3 and then sealing.

With reference again to the embodiment of FIG. 3, if found desirable or expedient to do so, the rear surface or support member for the print may be bonded to the inner surface of the rear wall member, e.g., through a pressure-sensitive adhesive or the like. In any event, following insertion of the print, the open side 28 is preferably sealed at some time prior, during or after the bonding of the image-bearing surface to the front wall member. By way of illustration, where the rear wall member is also vinyl, this may be accomplished by passing the pouch containing the print through a pair of heated pressure rollers. This procedure will also perfect the laminating bond between the print and the front wall member. FIG. 4 is a diagrammatical sectional view showing the resulting ID card after completing the bonding and sealing of the open end.

Figure 5:
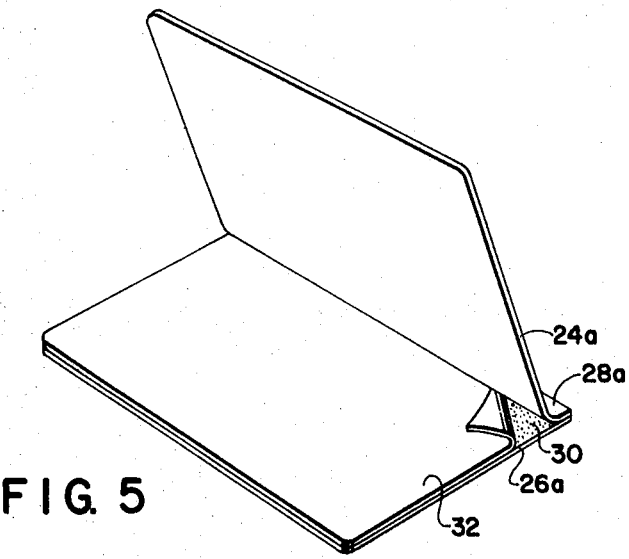
FIG. 5 is a perspective view of still another type of product to which this invention is applicable.

FIG. 5 shows another type of product to which this invention is applicable. As shown therein, a blank is provided comprising a front wall member 24a and a rear wall member 26a sealed along one edge 28a. The inner surface of front wall member 24a is provided with the layers for laminating, e.g., layers 16 and 18, as heretofore described. Front and rear wall members 24a and 26a may be the same as wall members 24 and 26, respectively. The inner surface of rear wall member 26a is provided with a layer of adhesive 30, preferably a pressure-sensitive adhesive. Means may be provided for preventing premature adhesion and in the embodiment shown such means are in fact provided in the form of a conventional release sheet 32 of glassine, polyethylene-coated paper or the like, sheet 32 being readily strippable from coating 30. Products of this general structure are described and claimed in the copending application of Paul A. Andrews, Ser. No. 718,895, filed concurrently. Accordingly, the general product structure per se comprises no part of the present invention which serves only to provide novel bonding means for use with such a product. An ID card may be prepared in accordance with the procedures described in the aforementioned copending application, namely by pressing the moist surface of the print against the inner surface of front wall member 24a, removing the release sheet 32, and then bringing the respective wall members in superposition and sealing. The wall members are preferably somewhat larger in dimensions than the print, so that a peripheral area of the superposed wall members free from contact with the print may be bonded together by the adhesive coating to perfect a tight seal.

In the embodiments shown in FIGS. 3-5, the rear wall member may be provided with suitable indicia and/or design pertaining to the issuer and/or bearer. This descriptive matter may be supplied in whole or in part prior or subsequent to sealing. It may also contain identifying matter in the form of embossing or coded hole-punching (an example of the latter being the so-called Hollerith card) which may be employed with known devices for recording purchases, billing or other bookkeeping matters.

Figure 6:
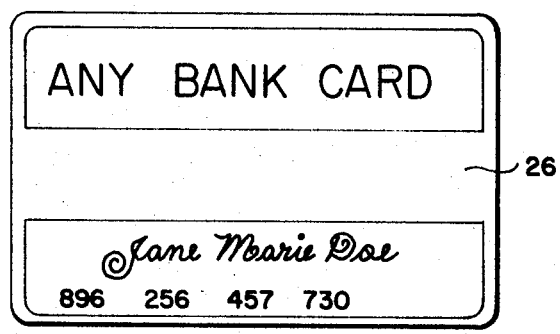
FIG. 6 is a plan view showing a typical design and structure which the rear wall of a product such as shown in FIG. 3 or 4 may take.

FIG. 6 shows a typical form which the outer surface of the rear wall member may take. It may, for example, include a characteristic design in color of the issuer, the name of the issuer, and the name and an identifying serial number of the bearer in embossed lettering. As was mentioned previously, hole-punching of coded indicia may be employed in lieu of embossing.

The present invention is applicable to other product structures and those shown in the drawing are for purposes of illustration only. For example, a print containing a protective overlay as shown in FIG. 2 may be inserted into a pouch such as is shown in FIG. 3 and the open portion then sealed to provide an encased ID card. If desired, the vinyl overlay 20 may be bonded to the inner surface of sheet 24 by known means to prevent accidental movement of the print within the pouch and to provide additional security features.

The bond provided by the present invention has been found to be so strong as to resist completely all attempts of separation. Where known means of separation were attempted, e.g., even with the aid of a razor blade, the image-containing layer separated along with the protective overlay, i.e., separated from the support for the print. It will thus be seen that the present invention provides an excellent security seal which withstood all attempts by known methods to separate the image-bearing surface from the bonding layer. In products such as shown in FIGS. 3-5, the print is securely affixed between the respective wall members. In addition to providing a security seal not obtainable when the print is not so secured within the walls, the resulting product is capable of use in Hollerith card type operations, whereas a card containing a movable print is not.

In the foregoing description, reference has been made to bonding the surface of the print to a layer of a hydroxylated polymer. This layer may contain other ingredients performing specific desired functions in addition to bonding. It may, for example, also include antioxidants, ultraviolet light absorbers, etc. to protect the color print, e.g., to increase its stability against fading to the degradative effects of heat, light and/or moisture. It may also contain a mixture of the hydroxylated polymer and the ethylene-vinyl acetate copolymer, provided that at least about 10% hydroxylated polymer is present.

The following examples further serve to illustrate the practice of this invention.

Example 1

A sheet of nonplasticized rigid clear polyvinyl chloride approximately 2 5/16" x 3 1/4" was coated on one side with an aqueous dispersion of "Aircoflex 400" to provide a coating when dry approximately 0.8 mil thick. After this coating dried, a second coating comprising clear polyvinyl alcohol in a 50-50 methanol-water solution was applied thereover to provide a second coating which when dry was less than 0.1 mil thick.

Example 2

A second sheet of vinyl of approximately the same dimensions was heat-sealed along three sides to a sheet prepared as in Example 1 to provide a pouch such as is shown in FIG. 3.

Example 3

A first sheet was prepared in the manner described in Example 1. A second sheet commercially available from Flexcon Company comprising a semi-rigid flexible polyvinyl chloride containing a white pigment and having on one side thereof a pressure-sensitive adhesive, which sheet was of substantially the same dimensions as the first sheet, had provided over the adhesive layer a release sheet of polyethylene coated paper, leaving approximately 1/8 to 1/4" of the coating along one longitudinal edge exposed. The respective sheets were then placed in superposition and pressure was applied to seal the exposed portion of the pressure-sensitive adhesive-containing layer to the corresponding superposed area of the other sheet, thereby providing a blank such as is shown in FIG. 5.

Example 4

The precedure of Example 1 was repeated, substituting "Elvace" for the "Aircoflex 400."

Example 5

The procedure of Example 1 was repeated, except that an intermediate coating containing approximately a 50-50 mixture of polyvinyl alcohol and "Aircoflex 400" was applied between the two coatings described in Example 1.

Example 6

The procedure of Example 1 was repeated, except that toluene was added to the aqueous dispersion of the "Aircoflex 400."

Example 7

Polacolor Type 108 Land film was inserted into the No. 926 Land Identification System. A data card was then inserted and this card and the subject were simultaneously photographed to provide a developable image on the photosensitive element of the film. The exposed photosensitive element was then pulled from the camera while in superposition with the image-receiving element of the film, the two elements were maintained in superposition outside the camera for approximately 60 seconds and then separated to reveal a positive multicolor transfer image.

Example 8

The image-bearing surface of a color print as prepared in Example 7 was pressed while still moist from processing against a coated vinyl sheet as prepared in Example 1 to provide a tight lamination as shown in FIG. 2.

Example 9

A color image as prepared in Example 7 was inserted while still moist within a pouch as prepared in Example 2 with the image-bearing surface against the coated vinyl sheet. The pouch was then heat sealed by passing through a pair of opposed heated rollers to provide an ID card as shown in FIG. 4.

Example 10

A color print as prepared in Example 7 was inserted while still moist with the blank prepared in Example 3 with the image-bearing surface against the polyvinyl alcohol coating. The release sheet was stripped from the pressure-sensitive adhesive coating and the respective sheets were brought in superposition and passed through a pair of standard opposed pressure rollers to effect sealing.

Example 11

Photographic prints as prepared in Example 7 were pressed while moist against the coated surfaces of the sheets prepared in Examples 4, 5 and 6 to provide in each instance a laminar structure comparable to that obtained in Example 8.

Example 12

The strength of the bonding of the print to the vinyl sheet was tested with laminar structures as prepared above. In these tests, attempts were made to sever the print from the vinyl with or without the aid of a razor blade. In all instances, the image-bearing surface separated from its support and remained tightly adhered to the vinyl sheet.

Since certain changes may be made in the above product and process without departing from the scope of the invention herein involved, it is intended that all matter contained in the above description or shown in the accompanying drawing shall be interpreted as illustrative and not in a limiting sense.

What is claimed is:

1. A laminar structure comprising a photographic print in color, the surface of which is bonded to a first layer comprising a transparent hydroxylated polymer, said first layer being bonded to a layer comprising an ethylene vinyl acetate copolymer, and said second layer being bonded to one surface of a substantially transparent sheet comprising a polymer of vinyl chloride.

2. A product as defined in claim 1 wherein said hydroxylated polymer is polyvinyl alcohol.

3. A product as defined in claim 1 wherein said color print comprises a dye image contained on a dyeable stratum, said stratum comprising a mixture of poly-4-vinylpyridine and polyvinyl alcohol, said stratum being bonded to said first layer.

4. An ID card comprising two sheets of material sealed together along the periphery to define a container having a substantially transparent sheet material comprising a polymer of vinyl chloride as a front member and a rear member which may be transparent or opaque, and a laminar structure within said container and visible through said front member and wherein said structure comprises a photographic print in color the surface of which is bonded to said front member by a first layer comprising a transparent hydroxylated polymer bonded to a second layer comprising an ethylene vinyl acetate copolymer and said second layer is bonded to the front member.

5. A pouch-like element comprising a substantially transparent first sheet material comprising a polymer of vinyl chloride and a second sheet material in superposition and sealed together along a portion of their periphery, leaving an unsealed portion of the periphery adapted for insertion of an information-bearing document therebetween, and wherein the inner surface of said vinyl sheet has a first layer comprising an ethylene vinyl acetate copolymer and a second layer comprising a hydroxylated polymer.

6. A product as defined in claim 5 wherein said two sheets are sealed together along three sides of the periphery and said hydroxylated polymer is polyvinyl alcohol.

7. A product as defined in claim 5 wherein said second sheet is opaque and comprises an embossable material.

8. A product as defined in claim 7 wherein said second sheet comprises a polymer of vinyl chloride.

9. In a product for use in protecting an information-bearing element, which product comprises two sheets of substantially equal dimensions sealed together along one edge thereof to define front and back members adapted for holding a photograph when inserted therebetween, the front member comprising a substantially transparent sheet comprising a polymer of vinyl chloride, the inner surface of said back member containing a layer of a pressure-sensitive adhesive and a release sheet releasably secured to said pressure-sensitive adhesive, the improvement comprising a first layer on the inner surface of said vinyl sheet comprising an ethylene vinyl acetate copolymer and a second layer over said first layer, said second layer comprising a transparent hydroxylated polymer.

10. A product as defined in claim 9 wherein the outer surface of said back member comprises an information bearing surface, said back member further being embossable.

11. An ID card laminar structure including a substantially transparent front sheet comprising a polymer of vinyl chloride, the inner surface of which is provided with a first layer of an ethylene vinyl acetate copolymer and a second layer comprising a hydroxylated polymer; a photograph having an image-bearing front surface and a rear surface, the dimensions of said photograph being less than those of said front sheet, said photograph being substantially centered on said front sheet with the image-bearing surface thereof bonded to said front sheet through said two layers, leaving a peripheral area of said front sheet free from contact with said photograph, a back sheet of substantially the same dimensions as said front sheet having a peripheral area free from contact with said photograph, the opposed peripheral areas of said front and back sheets being sealed together to complete said lamination.

12. A product as defined in claim 11 wherein the rear surface of said photograph is bonded to the inner surface of said back sheet.

13. A product as defined in claim 11 wherein said hydroxylated polymer is polyvinyl alcohol and said photograph comprises a dye image on a dyeable stratum contained on a support material, said stratum comprising a mixture of poly-4-vinylpyridine and polyvinyl alcohol.

14. A product as defined in claim 13 wherein said back sheet comprises a polymer of vinyl chloride.

15. A product as defined in claim 14 wherein both of said vinyl sheets comprise polyvinyl chloride, said back sheet being opaque.

16. A product as defined in claim 15 wherein the outer surface of said back sheet is an information-bearing surface.

17. A product as defined in claim 16 including descriptive coded hole punching through said card, said card being adaptable for use with decoding means for deciphering said holes.

18. A product as defined in claim 16 wherein at least a portion of the information contained on said surface of said back sheet is in the form of embossing.

19. A transparent overlay for protecting an image-bearing surface, comprising a substantially transparent sheet comprising a polymer of vinyl chloride, one surface of said sheet having thereon, in order, a layer comprising ethylene vinyl acetate copolymer, and a layer comprising polyvinyl alcohol.

20. The process for protecting a color print and for providing a security seal for said print comprising the step of pressing said print, while moist, against the coated surface of the overlay defined in claim 19.

References Cited
UNITED STATES PATENTS

| | | | |
|---|---|---|---|
| 3,461,581 | 8/1969 | Hoffmann | 283—7X |
| 3,487,567 | 1/1970 | Waybright | 40—2.2X |
| 3,498,788 | 3/1970 | Haas | 96—29X |
| 3,506,630 | 4/1970 | Beier et al. | 260—87.3X |
| 3,511,655 | 5/1970 | Haas et al. | 117—1X |
| 3,512,286 | 5/1970 | Siegel | 40—2.2 |

HAROLD ANSHER, Primary Examiner

U.S. Cl. X.R.

40—2.2, 159; 96—29; 117—1, 76; 156—277; 161—6, 254, 256, 413; 283—7